United States Patent
Bell

[11] Patent Number: 5,535,691
[45] Date of Patent: Jul. 16, 1996

[54] SPRAY SUPPRESSOR FOR AIR CUSHION CRAFT

[75] Inventor: James C. Bell, New Orleans, La.

[73] Assignee: Textron Inc., Providence, R.I.

[21] Appl. No.: 417,209

[22] Filed: Apr. 5, 1995

[51] Int. Cl.⁶ ............................................. B63B 1/34
[52] U.S. Cl. ............................... 114/67 R; 180/123
[58] Field of Search .................. 114/67 A, 67 R; 180/122, 123

[56] References Cited

U.S. PATENT DOCUMENTS

| | | | |
|---|---|---|---|
| 3,384,198 | 5/1968 | Jones et al. | 114/67 A |
| 3,478,836 | 11/1969 | Eckered et al. | 114/67 A |
| 4,223,755 | 9/1980 | Hunt | 180/123 |
| 4,428,448 | 1/1984 | Tattersall et al. | 114/67 A |
| 4,489,667 | 12/1984 | Moore et al. | 114/67 A |
| 4,543,901 | 10/1985 | Stringer | 114/67 A |

FOREIGN PATENT DOCUMENTS

| | | | |
|---|---|---|---|
| 1444254 | 6/1990 | Japan | 180/123 |
| 303968 | 12/1990 | Japan | 180/123 |

Primary Examiner—Stephen Avila
Attorney, Agent, or Firm—Perman & Green

[57] ABSTRACT

A spray suppressor for an air cushion vehicle comprising inflatable loop elements fixed to the air cushion seal finger sleeves and positioned immediately outward from the air cushion boundary. The elements are pressurized to a pressure less than the air cushion and greater than the ambient pressure to capture spray and supplement the seal performance.

4 Claims, 1 Drawing Sheet

SPRAY SUPPRESSOR FOR AIR CUSHION CRAFT

BACKGROUND OF THE INVENTION

The present invention relates to an improved spray suppression system for an air cushion craft. Such craft are supported by a pressurized air cushion contained within a depending skirt installed about the bottom periphery of the craft's hull. The skirt consists of a peripheral bag fixed to the hull and a bow seal, a stern seal, and side seals extending downward from the bag. The bag is generally inflated by pressurizing air from the air cushion supply. Once inflated it acts as a fluid distribution medium and a resilient support for the craft to absorb and distribute shock. The seal assembly defines the air cushion containment structure and as such must be delicately balanced to provide, pitch and role stability, low drag, structural integrity, and restoring moment in addition to its basic role of air cushion containment.

The seal is constructed as a continuous assembly of contiguous fingers depending from the bag about the lower periphery of the craft. The fingers define individual cells open at the bottom and communicating with the interior of the bag at the top. To provide structure to the otherwise flexible element, each finger is pressurized by air from the peripheral bag. As such seals dip into the water, there is a pressure increase in the cell which generates a restoring moment at that position to stabilize the craft. The finger may be maintained at a pressure which is greater than the air cushion pressure.

The seal system is designed to define an area of supporting pressure under the craft, but does allow the escape of air from the cushion outward from the craft. This rapid movement of air outward through the gap between the seal and the sea creates significant turbulence and large amounts of spray and mist are generated. This spray creates problems of visibility and salt water infiltration into operating systems.

U.S. Pat. No. 4,223,755 illustrates an attempt to suppress spray in an air cushion vehicle. It comprises a flexible curtain installed downward over the outer surface of the seal system. Escaping air and mist is captured by the curtain which billows outward under pressure from the turbulent air. The air is allowed to escape through the holes in the upper area of the curtain. This type of apparatus has proved ineffectual in containing the spray because of the difficultly in maintaining a consistent curtain. A ballast was inserted in an attempt to restrain upward movement of the lower edge of the curtain, but this did not substantially improve the spray suppression performance. In addition, in this type of design, a significant penalty is paid in increased drag. Also collapse of the curtain, eliminates spray suppression along an entire segment of the vehicle.

It has been found that spray is generated due in large amount to the turbulence created as the cushion air escapes from its relatively high pressure to ambient pressure external to the craft. It is therefore the purpose of this invention to reduce the generation of fog and fine mist spray by reducing the differential pressure in the immediate vicinity of the air cushion boundary, to trap and redirect the remaining spray horizontally over the water surface and to enhance craft performance in the process.

SUMMARY OF THE INVENTION

The present invention relates to an improved system for suppressing spray emanating from air cushion vehicles which comprises an inflatable element attached to each finger of the seal system at its outer wall. The element is formed outboard of the finger and extends downward from the bag along the height of the finger. The element terminates in an open end at a distance upward from the lower edge of the finger. In this manner a secondary cell is defined which communicates at its upper portion with pressurized air. The element is designed to operate at a pressure between air cushion pressure and ambient pressure to create a stepped pressure differential at the air cushion boundary.

DESCRIPTION OF THE DRAWING

The preferred embodiment of the invention is described below with reference to the attached drawing in which.

DESCRIPTION OF THE PREFERRED EMBODIMENT

Figure 1:
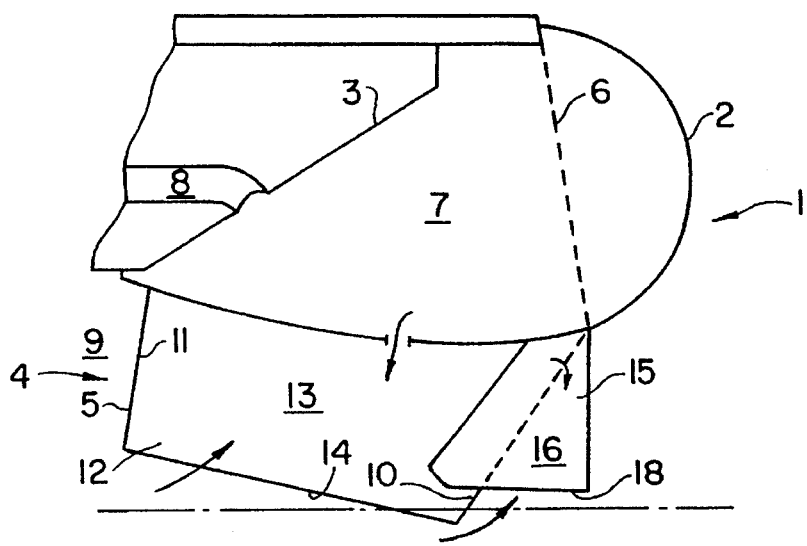
FIG. 1 is a side view of a seal finger employing a suppressor element in accordance with the subject invention.

The invention consists of a skirt system 1, as shown in FIG. 1, consisting of a flexible bag 2 fixed to the periphery of the hull 3 of an air cushion amphibious craft. The bag 2 is of conventional construction and performs to distribute air to the seal system and to act as a resilient support for the craft. Depending from the bag 2 is the seal assembly 4 attached to the bag 2 in a conventional manner. In the description below the seal structure of this invention is described with directions relative to the craft for example: outward means generally in the direction of the exterior of the craft.

As shown in FIG. 1, the bag 2 is supported by anti-bounce web 6 and is fixed to the hull 3. Bag 2 encloses a plenum 7 which extends through all sections of the bag 2 and is inflated by pressurized feed air 8 from the air cushion 9 lift fans.

Figure 2:
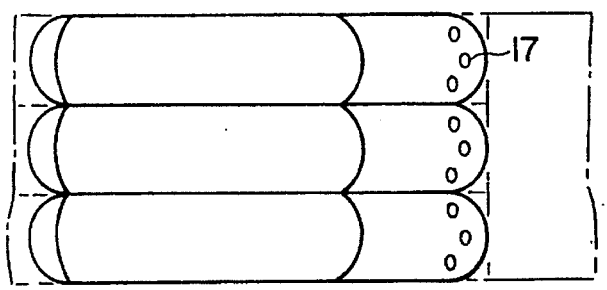
FIG. 2 is a bottom view of a seal finger employing a suppressor element in accordance with the subject invention.
Figure 3:
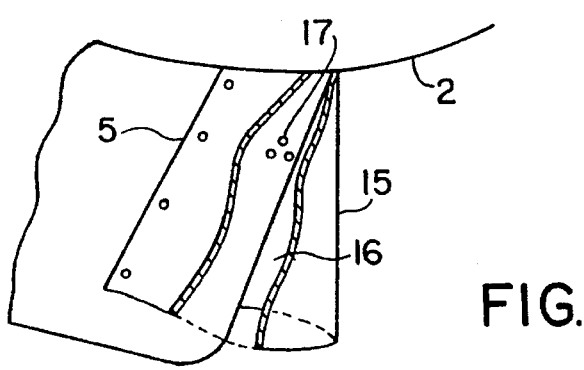
FIG. 3 is a perspective view with a partial cut away of a seal finger employing a suppressor element in accordance with the subject invention.

Seal element 5 is formed as a series of fingers each having an outer wall 10 and an inner wall 11 and a generally curved cross section, as shown in FIG. 2. The walls 10 and 11 are connected by side walls 12 to complete the finger and enclose the seal cell 13. Cell 13 is formed with a continuously reduced cross section from the bag 2 downward and has an opening 14 at its lower extremity. Cell 13 communicates with the bag plenum 7 to receive pressurized air 8. Pressurized air 8 maintains the seal finger 5 extended and provides structural rigidity to the element.

The finger 5 can be of any shape or size without hindering the performance of this invention. The spray suppressor element 15 may be formed of a single sheet of material similar to the material used to form the finger but of lighter weight. The element 15 is attached in a conventional manner to side walls 12 and at its upper portion to the bag at the juncture of the finger 5 and bag 2 or further up on bag 2. In this manner a curved cell 16 is defined which conforms generally to the shape of outer wall 10 of the element 5 and is closed at the top and open at the bottom at 18. The open end 18 of element 15 is positioned upward and outward of the seal finger exit 14 to capture and disperse spray and mist emanating from the air cushion 9. The cell 16 communicates with cell 13 of the finger 5 through apertures 17. Although there will be a build up of pressure within the cell 16, the pressure will be less than the pressure in either cell 13 or air cushion 9. A spray suppressor element 15 can be attached to each of the fingers of the seal 5 about the entire periphery of the craft or selectively where the problem is most severe.

In this manner a reduced pressure differential is achieved at the air cushion boundary and results in a significantly improved reduction of fog and fine mist spray emanating from the air cushion. Also, the spray is captured, condensed and dispersed downward. Residual spray is emitted horizontally outward at reduced pressure and turbulence, while generating substantially reduced mist. In addition it provides supplemental restoring moment and an increased planform to enhance performance.

In addition, the element 15 creates an additional element outboard of the element 5 and will function to some extent as does the element 5. If the craft rolls sufficiently to submerge open end 18 of cell 16 a pressure build up will occur and a differential pressure stabilizing moment will result. This results in a lighter weight, individual spray suppression element on each finger which if collapsed has only a limited effect on spray suppression. The spray suppression element of this invention also decreases drag.

What is claimed is:

1. In an amphibious craft supported above a surface by an air cushion and having a skirt system for supporting and containing the air cushion, wherein, the skirt system consists of a flexible bag inflated by a pressurized fluid surrounding the periphery of the bottom of the craft and extending downward therefrom, and a seal system depending downward from the inflated bag, and wherein said seal system comprises a series of flexible fingers fixed to and depending downward from the inflated bag each of said elements having an outward facing wall, an inward facing wall, and side walls, said walls cooperating to form a first interior cell communicating with the flexible bag to receive pressurized fluid therefrom to cause said finger to inflate; the improvement comprising:

a secondary outer wall attached to the outer wall of the finger to define a second cell extending substantially parallel to the first cell, said second cell being closed at the top and open at the bottom and communicating with pressurized air to inflate the second cell to a pressure less than air cushion pressure but greater than ambient pressure said bottom opening being positioned outward and upward from the bottom of the finger, in order to maintain said bottom opening out of the water during normal operation.

2. In an amphibious craft supported above a surface by an air cushion and having a skirt system for supporting and containing the air cushion as described in claim 1 wherein the inflatable element communicates at its upper end with the first interior cell through pressurized apertures in the outer wall thereof to receive pressurized fluid.

3. A spray suppressor element for an air cushion vehicle, said vehicle having a downward extending seal structure constructed with a series of downward extending pressurized fingers, each finger defining an interior cell open at its lower extremity, comprising a flexible wall fixed to the finger and extending outward therefrom to form an inflatable loop element open at the bottom and closed at the top, said element being pressurized to a pressure less than the pressure of the air cushion and greater than the ambient pressure external to the air cushion said bottom opening of the loop element being positioned outward and upward from the lower extremity of the finger, in order to maintain said bottom opening out of the water during normal operation.

4. A spray suppressor element for an air cushion vehicle having a downward extending seal structure constructed with a series of downward extending fingers, as described in claim 3 wherein the inflatable loop element communicates with said interior cell to receive pressurized fluid therefrom.

\* \* \* \* \*